Sept. 27, 1966  R. T. ARNOLD  3,275,175
CONTAINER TRANSPORT DEVICE
Filed May 14, 1964
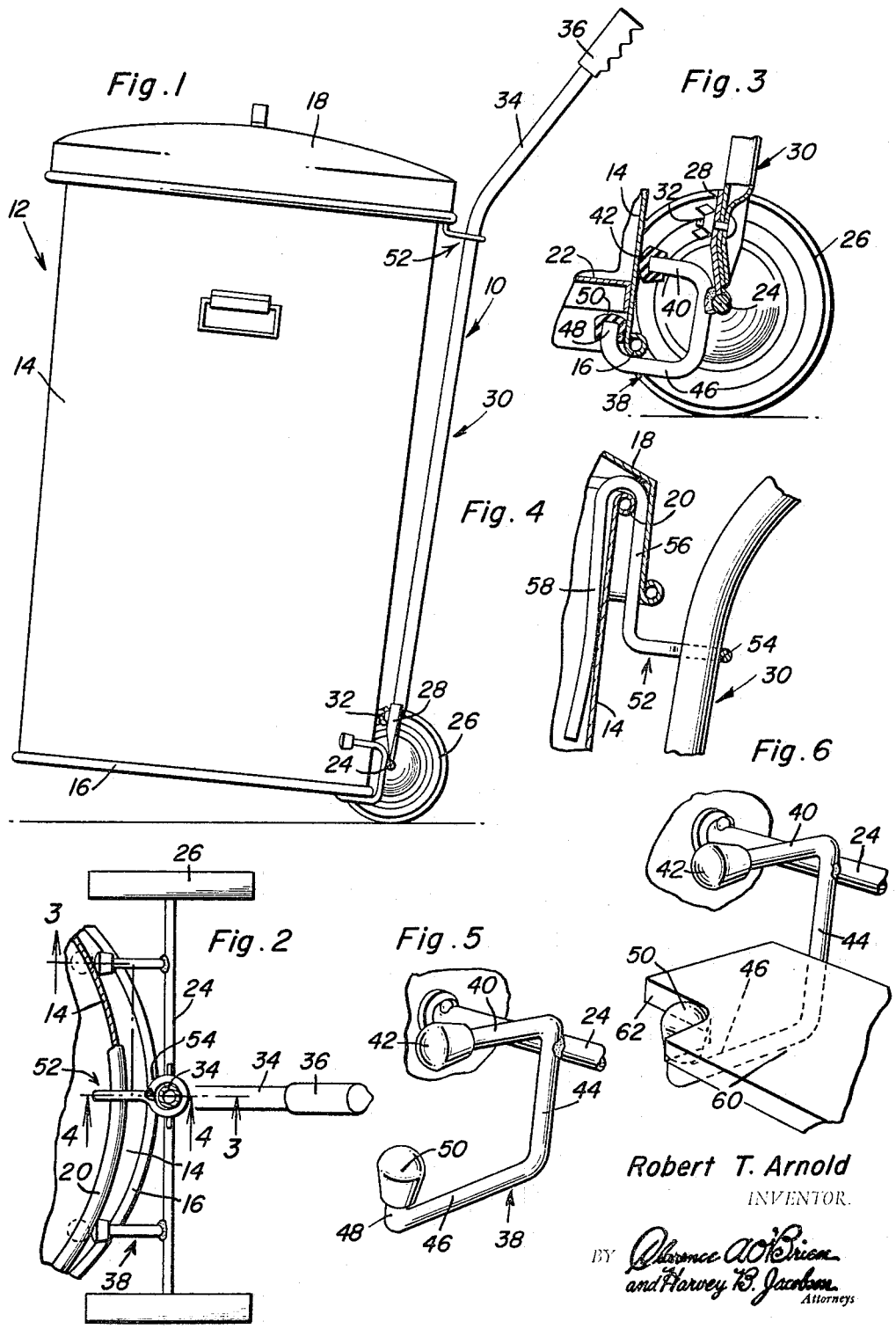
Robert T. Arnold
INVENTOR.

United States Patent Office 3,275,175
Patented Sept. 27, 1966

3,275,175
CONTAINER TRANSPORT DEVICE
Robert T. Arnold, % Arnold Metalcraft Co.,
P.O. Box 122, Lowell, Ind.
Filed May 14, 1964, Ser. No. 367,442
7 Claims. (Cl. 214—383)

This invention relates to a transport device or cart for containers such as trash cans or the like.

The present invention although particularly suited for facilitated movement of metallic trash cans having lids, is also useful in connection with the transport of other containers including those made of plastic materials.

It is therefore a primary object of the present invention to provide a container transport cart capable of being fabricated in an economical fashion and with a minimum of parts and material yet capable of firmly supporting a container and facilitate movement thereof from one place to another.

An additional object of the present invention is to provide a container transport device by means of which containers of different sizes, shapes and configurations may be firmly supported and wheeled from one place to another.

A still further object of the present invention is to provide a wheeled transport device for containers such as trash cans having facilities for firmly holding the trash can lid in place on top of the container.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the container transport device in use.

FIGURE 2 is a partial top plan view of the transport device with the lid removed and parts broken away and shown in section.

FIGURE 3 is a partial sectional view taken substantially through a plane indicated by section line 3—3 in FIGURE 2.

FIGURE 4 is a partial sectional view taken substantially through a plane indicated by section line 4—4 in FIGURE 2.

FIGURE 5 is a perspective view of a portion of the container transport cart showing one of the container-engaging devices.

FIGURE 6 is a perspective view of a portion of the transport device converted for support of a different type of container.

Referring now to the drawings in detail, it will be observed from FIGURE 1, that the transport device of the present invention generally referred to by reference numeral 10, is adapted to support a metallic trash can generally referred to by reference numeral 12 which includes a generally cylindrical vertical wall 14 having a bottom rim 16 and a removable cover lid 18 adapted to be placed over the top rim portion 20 of the container as more clearly seen in FIGURES 2 and 4. The type of container 12 shown supported on the transport device is also provided with a recessed bottom wall 22 as more clearly seen in FIGURE 3 so that the container is supported at the bottom along its bottom edge 16.

With continued reference to FIGURES 1, 2 and 3, it will be observed that the transport device 10 includes a horizontal axle 24 which rotatably mounts at its opposite lateral ends, a pair of wheels 26. Secured to the axle 24 midway between the wheels 26, is an upwardly extending connecting bracket 28 to which the lower end of an elongated handle member 30 is connected by means with an upper rearwardly inclined portion 34 at the end of which a handle grip 36 is mounted. It will therefore be apparent, that the elongated handle 30 may be readily assembled or disassembled from the wheel and axle assembly for storage or packaging purposes.

Rigidly secured to the axle 24 as by welding are a pair of laterally spaced container-engaging devices 38. The engaging devices are therefore disposed on laterally opposite sides of the handle 30 for engagement with the container adjacent the bottom portions thereof in order to provide firm lateral support for the container in addition to supporting the vertical load thereof. With continued reference to FIGURES 3 and 5 in particular, it will be observed that each of the container-engaging devices 38 includes an upper leg portion 40 which extends forwardly from the axle 24 just above the horizontal axis thereof so as to engage the vertical wall 14 of the container above the axle. The forward end of the upper leg portion 40 therefore mounts a resilient engaging element 42 adapted to contact the outside surface of the vertical wall of the container. The upper leg portion 40 is connected to the axle by means of the vertical connecting portion 44 to which the axle is welded. Extending forwardly from the vertical connecting portion below the axle, is a lower arm portion 46 which is generally parallel to the upper leg portion 40 but extends forwardly beyond the upper leg portion by an amount sufficient to engage the inside surface of the vertical wall 14 as shown in FIGURE 3. The end of the lower arm portion 46 remote from the axle is therefore connected to an upwardly extending portion 48 on which another resilient engaging element 50 is mounted. Accordingly, the lower engaging element 50 extends perpendicular to the upper engaging element 42 and is spaced therefrom in a forward direction so as to engage opposite sides of the vertical wall and is also vertically spaced therebelow so that a resisting couple will be applied to the container in order to support the load of the container. The bottom edge 16 of the container therefore rests on the lower arm portions 46 of the engaging devices.

Referring now to FIGURES 1, 2 and 4, it will be observed that a hook member 52 is slidably mounted on the handle 30 so that it may engage the top rim portion 20 of the container below the lid 18. The hook member includes a ring portion 54 encircling the handle 30 so as to be slidably mounted thereon. Extending vertically upward from the ring portion 54 in forwardly spaced relation to the handle, is an outer hook section 56 forming a U-shaped configuration with the inner hook section 58 in order to embrace the top rim portion 20 of the container. The hook member thereby prevents forward tilting of the container relative to the cart and also permits the lid 18 to be placed over the top rim of the container in wedging engagement with the hook section 56 in order to hold the lid firmly on the container during transport.

The construction and utility of the container transport device will be apparent from the foregoing description. It will therefore be appreciated, that a container may be readily mounted on the transport device when it is tilted forwardly by placing the bottom rim 16 over the upwardly extending portions 48 of the engaging devices 38. The vertical wall 14 of the container will then be brought into pressure engagement with the engaging elements 50 and 42. After the vertically slidable hook member 52 is engaged over the top rim 20 of the container, the cart may be tilted rearwardly as illustrated in FIGURE 2 so that it may be wheeled to any location desired. The engagement of the container between the resilient engaging elements 42 and 50 of the engaging devices will therefore provide the firm support for the container. It will of course be appreciated that the support so provided is particularly suited for containers having recessed bottoms. However, should it be desired to also support a plastic type container for example having a rimless bottom, a laterally extending platform member 60 may be provided as illustrated in FIGURE 6. The platform member therefore extends laterally between the lower arm portions 46 of the engaging devices 38 to provide a supporting surface for a portion of the bottom of the container. The platform member adjacent the ends thereof is provided with notches 62 which enclose the upwardly extending engaging elements 50 and thereby protects the bottom of the container from damage. Accordingly, the provision of the platform member 60 increases the versatility of the transport device by accommodating different types of containers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A transport device comprising in combination a container having a vertical wall with a top rim and a bottom, an axle, a pair of wheels rotatably mounted by said axle, a pair of laterally spaced container-engaging devices fixedly secured to the axle between the wheels, each of said engaging devices including an upper projecting portion engageable with the vertical wall of the container spaced above the bottom and a lower projecting portion extending forwardly beyond the upper portion below the bottom of the container, said lower projecting portion including a forwardly extending arm having an end remote from the axle and an engaging element connected to said end engageable with the container in vertically spaced relation to the upper portion, whereby said container is supported between said pair of engaging devices.

2. The combination of claim 1 including an elongated handle secured to the axle between said pair of engaging devices, and hook means slidably mounted on the handle for engaging the top rim of the container.

3. The combination of claim 2 wherein said hook means includes a vertically extending portion received below a lid placed over the top rim of the container to firmly hold the lid on the container.

4. The combination of claim 3 including a detachable platform member supported between the forwardly extending arms of the engaging devices having end notches receives the engaging elements to support a container having a rimless bottom.

5. The combination of claim 1 including a detachable platform member supported between the forwardly extending arms of the engaging devices having end notches receives the the engaging elements to support a container having a rimless bottom.

6. A transport device comprising in combination a container, an axle, a pair of wheels rotatably mounted by said axle, a pair of laterally spaced container-engaging devices fixedly secured to the axle between the wheels, each of said engaging devices including an upper portion engageable with the container above the axle, a lower arm connected to the axle and extending forwardly and including means at right angles to the arm for engagement with the container below the axle, a handle secured to the axle between said pair of engaging devices, and hook means slidably mounted on the handle for engagement with the container in vertically spaced relation above the engaging devices.

7. The combination of claim 1 wherein said hook means includes a portion for wedging engagement with a lid received over a top rim of the container.

References Cited by the Examiner

UNITED STATES PATENTS

| | | | |
|---|---|---|---|
| 771,084 | 10/1904 | Blomquist | 214—381 |
| 1,155,081 | 9/1915 | More | 214—383 |
| 1,255,484 | 2/1918 | Stephens | 214—384 |
| 2,673,654 | 3/1954 | Kaufman | 214—383 X |
| 2,784,856 | 3/1957 | Jordan | 214—383 |
| 2,851,180 | 9/1958 | McCabe | 214—384 |
| 3,008,595 | 11/1961 | Van Lokeran et al. | 214—383 |

FOREIGN PATENTS

| | | |
|---|---|---|
| 216,966 | 8/1961 | Austria. |

GERALD M. FORLENZA, *Primary Examiner.*

A. J. MAKAY, *Assistant Examiner.*